US006616528B2

(12) United States Patent
Wolters et al.

(10) Patent No.: US 6,616,528 B2
(45) Date of Patent: Sep. 9, 2003

(54) VERTICAL CROP RESIDUE CHOPPER AND SPREADER

(75) Inventors: Joshua J. Wolters, Geneseo, IL (US); Robert A. Matousek, Milan, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/015,357

(22) Filed: Dec. 12, 2001

(65) Prior Publication Data

US 2003/0109294 A1 Jun. 12, 2003

(51) Int. Cl.[7] .............................................. A01F 12/00
(52) U.S. Cl. ....................................... 460/111; 460/901
(58) Field of Search ................................ 460/111, 112, 460/119, 901

(56) References Cited

U.S. PATENT DOCUMENTS

| 3,670,739 A | | 6/1972 | Rowland-Hill | 130/27 |
|---|---|---|---|---|
| 4,612,941 A | | 9/1986 | Kunde | 130/27 |
| 4,735,216 A | | 4/1988 | Scott et al. | 130/27 |
| 4,892,504 A | | 1/1990 | Scott et al. | 460/112 |
| 4,923,431 A | * | 5/1990 | Miller et al. | 460/111 |
| 5,021,028 A | | 6/1991 | Kersting et al. | 460/85 |
| 5,042,973 A | | 8/1991 | Hammarstrand | 460/112 |
| 5,272,861 A | | 12/1993 | Roynberg | 56/504 |
| 5,482,508 A | | 1/1996 | Redekop et al. | 460/112 |
| 5,556,042 A | | 9/1996 | Roberg | 241/101.76 |
| 5,769,711 A | | 6/1998 | Roberg | 460/73 |
| 5,797,793 A | * | 8/1998 | Matousek et al. | 460/111 |
| 5,833,533 A | | 11/1998 | Roberg | 460/112 |
| 5,913,724 A | | 6/1999 | Roberg | 460/83 |
| 5,928,079 A | | 7/1999 | Roberg | 460/83 |
| 5,928,080 A | | 7/1999 | Jakobi | 460/112 |
| 6,027,407 A | | 2/2000 | Roberg | 460/80 |
| 6,070,816 A | | 6/2000 | Hirsch | 241/101.742 |
| 6,113,491 A | | 9/2000 | Holmén | 460/111 |
| 6,152,820 A | | 11/2000 | Heidjann et al. | 460/112 |
| 6,241,605 B1 | | 6/2001 | Pfeiffer et al. | 460/69 |
| 6,251,009 B1 | | 6/2001 | Grywacheski et al. | 460/112 |

FOREIGN PATENT DOCUMENTS

| DE | 259019 A1 | * 1/1977 | 460/112 |
|---|---|---|---|
| DE | 3529801 | 1/1987 | |

* cited by examiner

Primary Examiner—Thomas B. Will
Assistant Examiner—Meredith Petravick
(74) Attorney, Agent, or Firm—John William Stader; Rebecca L. Henkel

(57) ABSTRACT

A crop residue chopper and spreader for an agricultural combine. The chopper and spreader includes a disk mounted for rotation in a predetermined rotational direction about an axis oriented horizontally or at a small acute angle to horizontal, the disk including at least one radially outwardly extending impeller having a radial outermost periphery. The chopper and spreader includes a housing at least partially containing the disk and including an upwardly facing inlet opening located generally above the disk for receiving a flow of crop residue from a threshing mechanism of the combine, and a radially facing discharge opening located generally below the disk for discharging the flow of crop residue. The chopper and spreader additionally includes cutting elements mounted on the housing and on the radially outermost periphery of the at least one impeller cooperable for cutting the crop residue when passing through the housing from the inlet opening to the discharge opening.

9 Claims, 4 Drawing Sheets

VERTICAL CROP RESIDUE CHOPPER AND SPREADER

TECHNICAL FIELD

This invention relates generally to crop residue choppers and spreaders for agricultural combines, and, more particularly, to a vertical chopper and spreader that provides better residue flow therethrough compared to known horizontal choppers and spreaders and better and greater sideward spreading and dispersal of the residue over a field from which the crop was harvested.

BACKGROUND ART

Crop residue choppers and spreaders for agricultural combines are well known. Reference in this regard Hirsch U.S. Pat. No. 6,070,816 issued Jun. 6, 2000 to Deere & Company, which discloses a straw chopper utilizing a pair of rotors rotatable about respective vertical axes and outfitted with a number of circumferentially spaced vertically arrayed impeller blades which intermesh with vertical arrays of shear bars in vertical spaces in a housing containing the rotors, for chopping crop residue which enters the spaces through sideward openings in the housing. An observed shortcoming of choppers such as this, however, is that the rotors are enclosed at the top, which prevents crop residue flow thereto from that direction so as to necessitates placement of the chopper at a relatively high location to allow for the infeeding of the crop residue thereto from the side. However, even at the higher location, straw separated from the grain by the threshing mechanism of the combine at a high location and blown or otherwise conveyed or fed to the chopper must follow a "dog leg" or similar path including one or more sharp bends to enter the chopper. As another observed shortcoming, due to the horizontal rotation of the rotors about vertical axes, the range of crop residue dispersal over a field can be limited, as the trajectory of the crop residue when propelled from the chopper is basically only horizontally or downwardly, not upwardly which would allow for a longer trajectory for a given motive force. Still further, a disadvantage of utilizing impeller blades on a rotor of a chopper cooperable with shear bars on a housing containing the rotor for achieving a cutting effect, is that it is not easy to convert the chopper to solely operation as a spreader, as is desirable for some harvesting applications.

Thus, what is sought is a rotary chopper for an agricultural combine which overcomes the shortcomings and disadvantages discussed above.

SUMMARY OF THE INVENTION

According to the invention a crop residue chopper and spreader for an agricultural combine which overcomes many of the shortcoming and disadvantages discussed above is disclosed. The chopper and spreader includes a disk mounted for rotation in a predetermined rotational direction about an axis oriented horizontally or at a small acute angle to horizontal, the disk including at least one radially outwardly extending impeller having a radial outermost periphery. The chopper and spreader includes a housing at least partially containing the disk and including an upwardly facing inlet opening located generally above the disk for receiving a flow of crop residue from a threshing mechanism of the combine, and a radially facing discharge opening located generally below the disk for discharging the flow of crop residue. The chopper and spreader additionally includes cutting elements mounted on the housing and on the radially outermost periphery of the at least one impeller cooperable for cutting the crop residue when passing through the housing from the inlet opening to the discharge opening.

The cutting elements can include knives on the radial outermost periphery of the at least one impeller cooperatively receivable in slots in the housing as the disk is rotated, or knives at fixed locations on or in the housing positioned to pass through slots in the radial outer periphery of the at least one impeller when rotated.

Additionally, one or more flow guides are preferably disposed adjacent to the discharge opening for guiding the flow of crop residue discharged from the chopper and spreader radially outwardly and sidewardly from the combine for dispersal over a field from which the crop was just harvested. One or more flow deflectors can also optionally be disposed downstream in the discharged crop residue flow for damping or further guiding the flow.

DETAILED DESCRIPTION OF THE INVENTION

Figure 1:
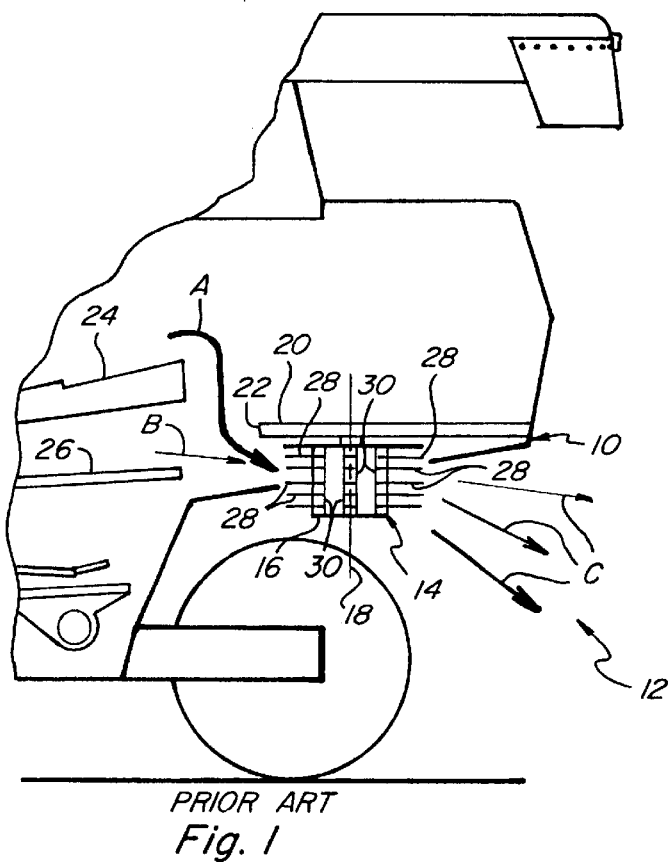
FIG. 1 is a simplified fragmentary schematical side elevational view of the rear end a typical prior art agricultural combine, showing a prior art straw chopper thereof and illustrating with arrows crop residue flow patterns to the chopper.

Referring now to the drawings, wherein preferred embodiments of the present invention are shown, in FIG. 1, a rear end 10 of a typical prior art self-propelled agricultural combine 12 is shown, including a representative rotary straw chopper 14 including a rotor 16 rotatable about a vertical axis 18 within a housing 20 having at least two side walls (deleted here for clarity) and a closed top 22. A flow of straw and other residue, represented by larger arrow A, is directed to an open front of straw chopper 14 from a straw walker mechanism 24 which in turn receives the straw and other residue from a threshing mechanism (not shown) located forwardly thereof. Still other crop residue such as chaff, including seed pods and husks removed from the grain by a cleaning apparatus 26, can also be delivered to chopper 14, as represented by smaller arrow B. The straw and other crop residue will be received by chopper 14 and cut up by the interaction of flails or knives 28 mounted on the radial outer ends of impeller blades 30 of rotor 16 with fixed shear bars (located on the other side of rotor 16) and discharged outwardly and downwardly from chopper 14 as represented by arrows C. An observed shortcoming of this arrangement is the "dog leg" path illustrated by arrow A that the straw and other residue such as bean stalks must follow enroute from straw walker mechanism 24 to chopper 14 due to the inability to feed the residue into chopper 14 from the closed top, particularly when harvesting grasses such as wheat, and also soybeans. The problem encountered when feeding wheat straw into the chopper is due primarily to the volume of the wheat straw handled, and the problem with bean stalks is due to the bulk and length of the stalks, both of which make it difficult for the flow of crop residue to make turns such as illustrated by arrow A. This problem could possibly be alleviated by raising the chopper to the level of the straw walker, but that would make it difficult to direct chaff residue from the cleaning apparatus into the chopper.

Figure 2:
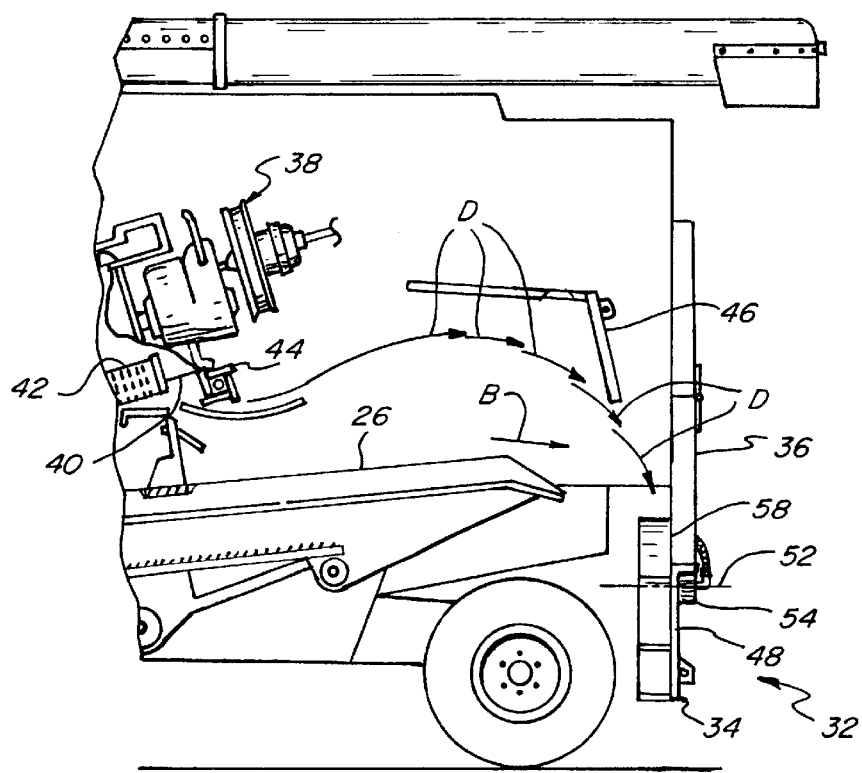
FIG. 2 is a simplified fragmentary schematical side elevational view of the rear end a typical agricultural combine, showing aspects of a threshing mechanism thereof and a pair of crop residue chopper and spreader mechanisms according to the invention thereon and illustrating with arrows crop residue flow patterns from the threshing mechanism to the chopper and spreader mechanisms.
Figure 3:
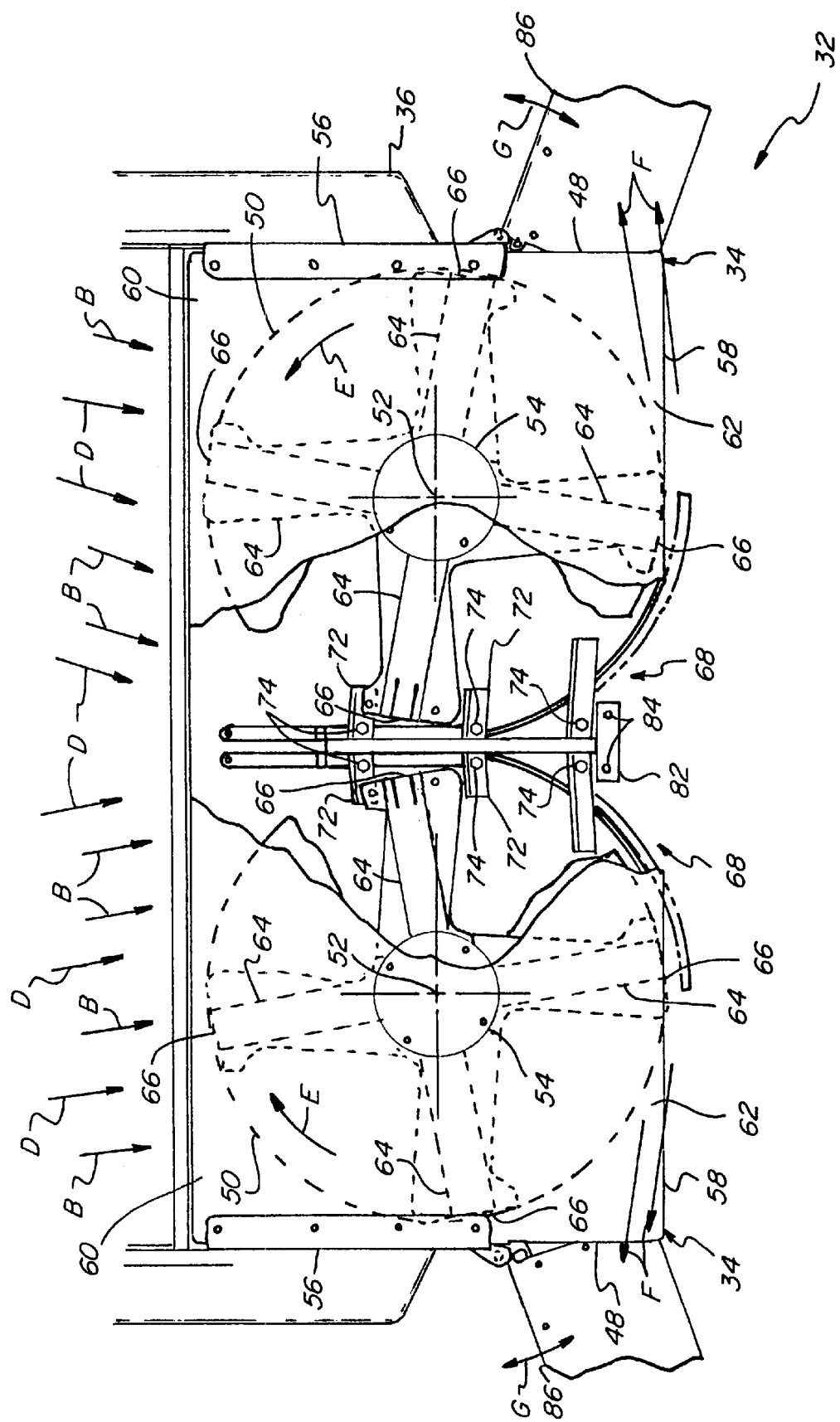
FIG. 3 is a fragmentary rear elevational view of the combine of FIG. 2 showing the chopper and spreader mechanisms thereof.

Referring to FIGS. 2 and 3, as a solution to the above problems, an axial feed combine 32 is shown including a pair of crop residue chopper and spreader mechanisms 34 constructed according to the present invention. Chopper and spreader mechanisms 34 are mounted to a rear end 36 of combine 32 in side by side relation, importantly, in a vertical or near vertical endmost portion of a flow path or trajectory of a crop residue flow, represented by arrows D, from a threshing mechanism 38 of combine 32. Threshing mechanism 38 includes a rotor 40 rotatable in a concave 42 for separating straw stalks and the like from the harvested crop, and a beater 44 rotatable for directing the flow of straw and other residue rearwardly along the airborne trajectory or flow path D, as is well known in the art. The vertical or near vertical downward terminal end of the trajectory or flow path is partly the result of gravity and also deflection of the flow by a deflector 46 located upstream and above chopper and spreader mechanisms 34. Chaff and other additional residue separated from the grain by cleaning apparatus 26 also flows to chopper and spreader mechanisms 34, as represented by arrow B. Here, it should be noted that chopper and spreader mechanisms 34 are located rearwardly and elevationally beneath both beater 44 and cleaning apparatus 26, such that the crop residue does not have to make any difficult turns enroute to mechanisms 34.

Each chopper and spreader mechanism 34 includes a housing 48 of sheet metal or other construction containing a disk 50 rotatable in a predetermined rotational direction, denoted by arrows E, about a rotational axis 52 by a suitable driving element, such as by a conventionally constructed and operable hydraulic motor 54 powered by pressurized hydraulic fluid received from a pump (not shown) of combine 12, an electric motor, belt, or the like. Rotational axes 52 are each generally horizontal or oriented at only a small acute angle to horizontal. Housings 48 each include a radial outer side wall 56, and a rear wall 58, defining a cavity containing disk 50, as well as a forwardly and upwardly facing inlet opening 60 for receiving a desired portion of the downward residue flows denoted by arrows B and D, and a downwardly and radially facing discharge opening 62 through which the residue is propelled by disk 50. Residue flow within each housing 48 is propelled by rotating respective disks 50 in the predetermined rotational directions E, at a speed which is equal to or increased relative to the inlet speed of the residue flows such that the residue does not build up at the inlet and is expelled from housing 48 through discharge opening 62 at a corresponding speed. Each disk 50 includes at least one impeller blade 64 projecting radially outwardly from respective axis 52 and terminating at a radially outermost peripheral end 66.

Figure 4:
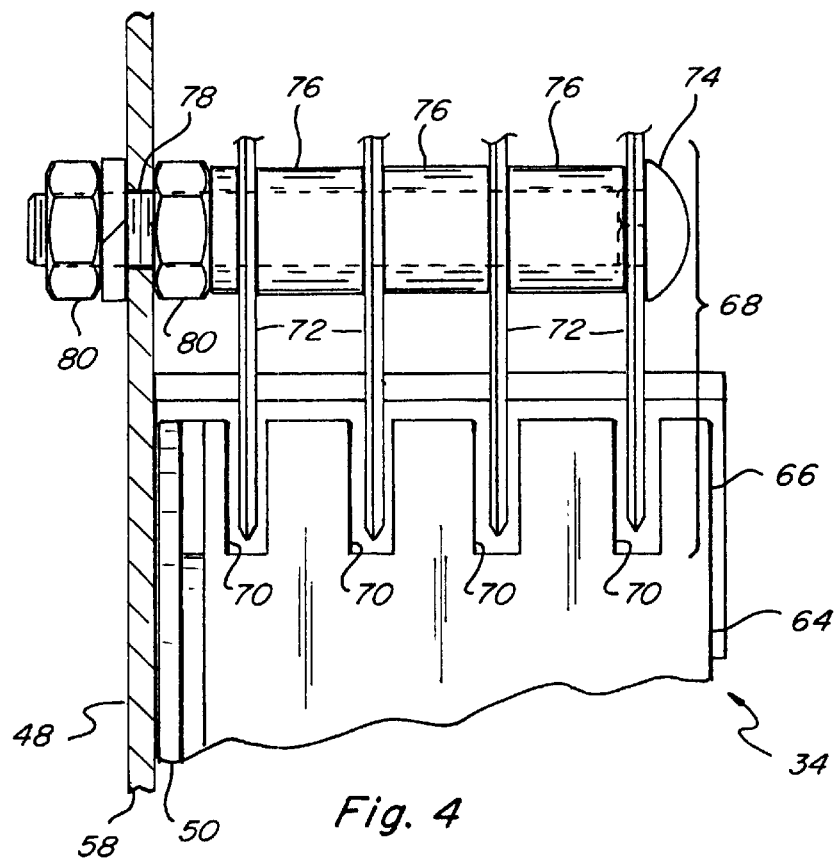
FIG. 4 is a fragmentary side view in partial cross section of a chopper and spreader mechanism of FIGS. 2 and 3 showing cooperation of aspects of cutting elements thereof.
Figure 5:
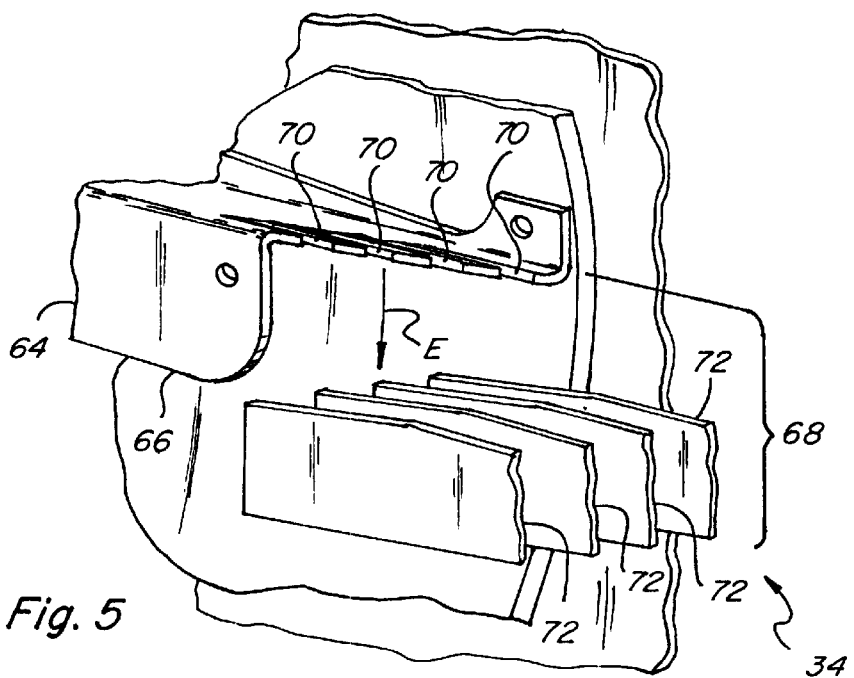
FIG. 5 is a fragmentary perspective view of the cutting elements of FIG. 4.

Referring also to FIGS. 4 and 5, outermost peripheral end 66 of each impeller blade 64 and housing 48 include cutting elements 68 cooperable for cutting up crop residue passing through housing 48 as disks 50 are rotated in the direction E, including a plurality of axially spaced radially outwardly facing slots 70 through peripheral ends 66 which cooperatively receive arrays or gangs of correspondingly spaced knives 72 mounted to rear wall 58 in housing 48 at angularly spaced locations around axes 52, respectively. Referring more particularly to FIG. 4, each array or gang of knives 72 is mounted on an elongate bolt 74 and separated by spacers 76, bolt 74 passing through a hole 78 through wall 58 and secured or fixed in position by nuts 80 (also shown in FIG. 3), or using any other convenient and effective fasteners, as desired. Here, it should be noted that knives 72 located at the lowermost position in housing 48 are longer than those located higher, this being to allow the lower knives 72 to reach and extend through slots 70 from their mounting positions, as shown in FIG. 3. If desired, to allow easily removing knives 72 as a unit, bolts can instead extend through a removable elongate frame 82 which removably mounts to rear wall 58 using one or more conveniently located fasteners, such as bolts 84, which pass through holes in frame 82 and wall 58 and secured in position by nuts (not shown). Convenient and easy removal of knives 72 allows quickly converting mechanisms 38 to spreader operation only, when that is desired.

Crop residue chopped by cutting elements 68 will be discharged through discharge opening 62 and the outward flow will be guided radially outwardly by curved flow guides. Due to the rotation of disks 50 about horizontal or near horizontal axes 52, some of the discharge flow of the residue will be directed upwardly, as denoted by arrows F. To control this, and to otherwise damp the discharge flow of residue, flow deflectors 86 can be optionally provided downstream in the residue flow path as shown in FIG. 3, and adjusted as shown by arrows G at least upwardly and downwardly to provide the desired effect such that the residue is spread over a region of the field from which the crop has just been harvested.

Figure 6:
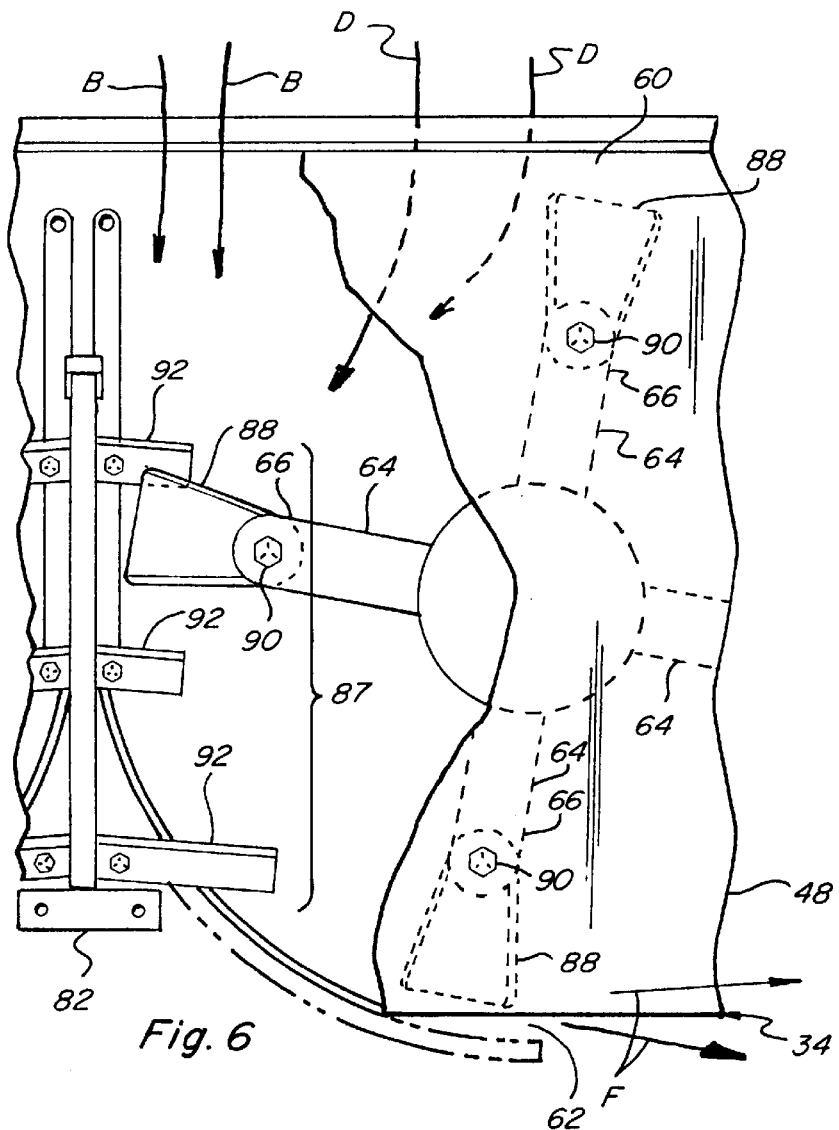
FIG. 6 is a fragmentary rear view of a chopper and spreader mechanism of FIG. 2 showing alternative cutting elements thereon.

Turning to FIG. 6, one of the crop residue chopper and spreader mechanisms 34 is shown including alternative cutting elements 87 according to the present invention. Cutting elements 87 differ from cutting elements 68 as previously discussed by the provision of gangs of spaced knives 88 fixedly mounted on outermost peripheral ends 66 of impeller blades 64 by bolts 90, knives 88 being positioned for passage through correspondingly spaced shear bars 92 mounted to rear wall 58 in the above-described manner, or to a removable frame 82, as also discussed above. Crop residue flows B and D entering housing 48 through inlet opening 60 will be effectively cut up by cutting elements 87 and discharged through discharge opening 62, in the above-described manner.

Figure 7:
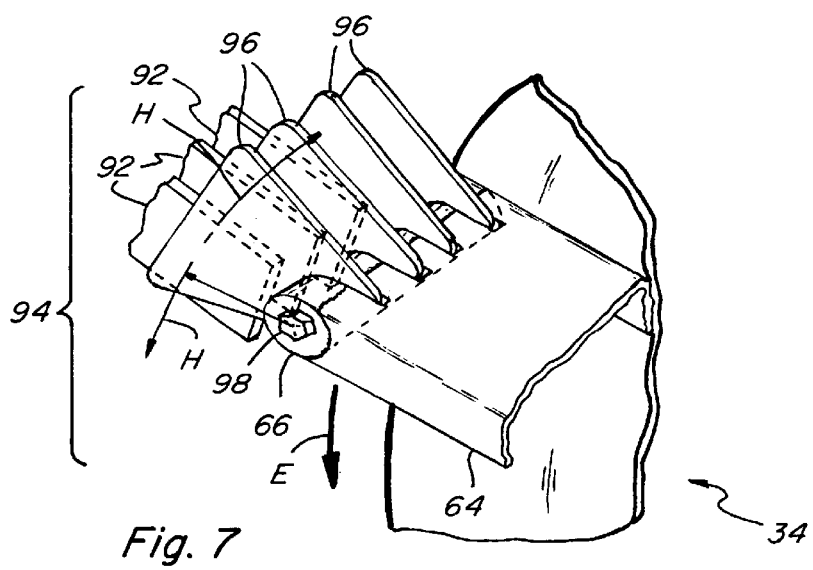
FIG. 7 is a fragmentary perspective view of a chopper and spreader mechanism of FIG. 2 showing still other alternative cutting elements thereon.

In FIG. 7, still other alternative cutting elements according to the present invention for use with a crop residue chopper and spreader mechanism 34 are shown. Cutting elements 94 differ from cutting elements 87 and 68 by the provision of flails 96 mounted on peripheral ends 66 of impeller blades 64 for rotation thereabout, as represented by arrows H, flails 96 being spaced and positioned for passage between shear bars 92 mounted on housing 48 in the above-described manner, for providing a desired cutting effect as impeller blades 64 are rotated in the direction E in the above-described manner.

Here, it should be noted that although crop residue chopper and spreader mechanisms 34 are shown utilized with a combine 32 including a beater 44 for directing straw, stalks and other residue rearwardly and downwardly, other mechanisms and means can be used for such delivery, such as straw walker mechanisms and the like. Here also, it should be noted that cutting elements other than elements 68, 87 and 94 can be used with the present invention, such as but not limited to elements including other knives in place of the above-described shear bars.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A crop residue chopper and spreader for an agricultural combine comprising:
    a disk mounted for rotation in a predetermined rotational direction about an axis oriented horizontally or at a small acute angle to horizontal, the disk including at least one radially outwardly extending impeller having a radial outermost periphery;
    a housing at least partially containing the disk and including an upwardly directed radially facing inlet opening located generally above the disk for receiving a flow of crop residue from a threshing mechanism of the combine, and a radially facing discharge opening located generally below the disk for discharging the flow of crop residue; and
    cutting elements mounted on the housing and on the radially outermost periphery of the at least one impeller cooperable for cutting the crop residue when passing through the housing from the inlet opening to the discharge opening.

2. The crop residue chopper and spreader of claim 1 wherein the cutting elements comprise knives on the radial outermost periphery of the at least one impeller cooperatively receivable in slots in the housing as the disk is rotated.

3. The crop residue chopper and spreader of claim 1 wherein the cutting elements comprise knives mounted at a fixed location within the housing cooperatively receivable in slots through the radial outermost periphery of the at least one impeller.

4. The crop residue chopper and spreader of claim 3 wherein the knives are arranged in sets removable from the housing for conversion of the chopper and spreader to a spreader only.

5. A thresher and chopper arrangement for an agricultural combine, comprising:
    a rotating threshing mechanism for separating straw and other residue from plants harvested by the combine and propelling a flow of the straw and residue within the combine along an airborne trajectory including a downwardly and at least generally vertical endmost trajectory portion; and
    a chopper spreader mechanism disposed in the endmost trajectory portion in a position for receiving at least a portion of the flow of the straw and residue, the chopper spreader mechanism including a disk mounted for rotation in a predetermined rotational direction about an axis oriented horizontally or at a small acute angle to horizontal, the disk including at least one radially outwardly extending impeller having a radial outermost periphery, the disk and the impeller being at least partially contained in a housing including an upwardly directed radially facing inlet opening located generally above the disk in position for receiving at least a portion of the flow of the straw and residue in the endmost trajectory portion, and a radially facing discharge opening located generally below the disk for discharging the crop residue, and cutting elements mounted on the housing and the radially outermost periphery of the at least one impeller cooperable for cutting the crop residue therebetween as the crop residue passes through the housing from the inlet opening to the discharge opening.

6. The thresher and chopper arrangement of claim 5 wherein the cutting elements include knives mounted to the housing and arranged in sets removable from the housing for conversion of the chopper spreader to a spreader only.

7. An agricultural combine, comprising:
    a rotating threshing mechanism for separating crop residue from harvested plants, the threshing mechanism including apparatus for propelling the crop residue away from the threshing mechanism along a flow path including a final generally downwardly directed substantially vertical flow path portion located at an elevation lower than the apparatus; and
    a chopper spreader mechanism disposed in the generally downwardly extending flow path portion at a location lower than the apparatus and in position for receiving at least a portion of the crop residue flow, the chopper spreader mechanism including a disk mounted for rotation in a predetermined rotational direction about an axis oriented horizontally or at a small acute angle to horizontal, the disk including at least one radially outwardly extending impeller having a radial outermost periphery, the disk and the impeller being at least partially contained in a housing including an upwardly directed radially facing inlet opening located generally above the disk in the flow path for receiving crop residue flowing therealong from the threshing mechanism, and a radially facing discharge opening located generally below the disk for discharging the crop residue, and cutting elements mounted on the housing and the radially outermost periphery of the at least one impeller cooperable for cutting the crop residue when passing through the housing from the inlet opening to the discharge opening.

8. The combine of claim 7 wherein the cutting elements comprise knives mounted at a fixed location within the housing cooperatively receivable in slots through the radial outermost periphery of the at least one impeller.

9. The combine of claim 7 wherein the cutting elements comprise knives on the radial outermost periphery of the at least one impeller cooperatively receivable in slots in the housing as the disk is rotated.

* * * * *